(12) United States Patent
Inoue

(10) Patent No.: US 6,335,060 B1
(45) Date of Patent: Jan. 1, 2002

(54) CURABLE TREATING AGENT AND CURING TREATMENT PROCESS

(75) Inventor: Rie Inoue, Nara (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/580,919

(22) Filed: May 26, 2000

(30) Foreign Application Priority Data

| Jun. 1, 1999 | (JP) | 11-154409 |
| Jun. 1, 1999 | (JP) | 11-154410 |
| Sep. 28, 1999 | (JP) | 11-275345 |

(51) Int. Cl.$^7$ .................................................. C08J 2/46
(52) U.S. Cl. ................... 427/496; 427/391; 427/393; 427/395; 427/397; 427/551; 427/595; 522/72
(58) Field of Search ................. 427/496, 551, 427/595, 391, 393, 395, 397; 522/71, 72, 182, 170, 103

(56) References Cited

U.S. PATENT DOCUMENTS 5,834,576 A    11/1998    Nagano et al.

FOREIGN PATENT DOCUMENTS

| EP | 0061121 A1 | 9/1982 |
| EP | 0 424 006 A2 | 4/1991 |
| JP | 8-301817 A | 11/1996 |
| JP | 10-158471 A | 6/1998 |
| JP | 11-114914 A | 4/1999 |
| JP | 11-165302 A | 6/1999 |
| JP | 12-38426 A | 2/2000 |

OTHER PUBLICATIONS

Wright et al., "New Lightweight Materials: Balsa Wood–Polymer Composites Based on Ethyl a–(Hydroxymethyl)acrylate," Journal of Applied Polymer Science, pp. 2241–2247, (1993).

*Primary Examiner*—Bernard Pianalto

(57) ABSTRACT

The present invention provides a curable treating agent and a curing treatment process which provide excellent results with regard to any of heat resistance, water resistance, surface physical properties, and impregnability, and further, involve high productivity. The electron-beam-curable treating agent according to the present invention comprises a high boiling point resin in a ratio of not lower than 10 weight %, and is characterized in that the high boiling point resin includes a high boiling point radical-polymerizable component in a ratio of higher than 90 weight %, wherein the high boiling point radical-polymerizable component includes a specific acrylic derivative in a ratio of not lower than 5 weight %. The electron beam curing treatment process according to the present invention is characterized by comprising the step of irradiating a treating agent with an electron beam under specific conditions, wherein the treating agent includes a specific acrylic derivative. In addition, the heat-radical-curable resin composition and treating agent, according to the present invention, are characterized by comprising a specific acrylic derivative and a specific resin which has a polymerizable unsaturated double bond as directly linked to an ester bond.

10 Claims, No Drawings

CURABLE TREATING AGENT AND CURING TREATMENT PROCESS

BACKGROUND OF THE INVENTION

Technical Field

The present invention relates to an electron-beam-curable treating agent, an electron beam curing treatment process, a heat-radical-curable resin composition, a heat-radical-curable treating agent, and a heat-radical-curing treatment process for modification, for example, enhancement of the heat resistance, of cellulosic materials such as wood plates, dressing paper, laminated plywood, wood chips, cellulose fibers, and paper.

Background Art

Wood plates (which might be called veneers) or dressing paper is laminated onto surfaces of substrates, such as plywood, metal plates, and glass plates, for the purpose of giving a feeling of quality to the surfaces of the substrates in furniture for home or office use, or in interior decoration materials for buildings. In addition, a treatment is carried out for the purpose of increasing the surface hardness of the above surface-dressing materials (such as wood plates and dressing paper) and enhancing their properties such as moisture resistance, water resistance, and heat resistance. In this treatment, the surface-dressing materials are impregnated with a treating agent and then laminated onto substrates, and then the above treating agent is cured, or the above treating agent is impregnated into the surface-dressing materials and then cured in that state.

Also in the field of particle boards or fiber boards used as building materials and so on, the above treating agent is impregnated into wood chips or cellulose fibers (which are components of the particle boards or fiber boards) and then cured in order to enhance properties, such as moisture resistance, water resistance, and heat resistance, of the wood chips or cellulose fibers.

As to the above treating agent, those which include unsaturated polyester resins, vinyl ester resins, urethane (meth)acrylate resins, urea resins, or melamine resins are used as typical ones. Especially recently, studies are carried out to enhance the aforementioned properties by using resin compositions which contain specific resin components as essential components (JP-A-10-158471) or by impregnating specific monomer components into wood (JP-A-11-114914).

However, it is difficult to say that the conventional treating agents sufficiently satisfy all the above demanded properties, namely, heat resistance, water resistance, surface physical properties (e.g. surface hardness), moisture resistance, and impregnability.

For example, JP-A-10-158471 discloses a curable resin composition comprising an amino resin and a specific vinyl ester compound, but this resin composition does not exhibit sufficient performance in respect to the water resistance, because this resin composition contains the amino resin as an essential component.

In addition, JP-A-11-114914 discloses a treatment process comprising the steps of impregnating a specific hydrophilic vinyl monomer into wood and then curing the monomer, but this treatment process is not on a satisfactory level with regard to surface physical properties (e.g. surface hardness) or surface material feel.

In addition, in treatment processes involving the use of the aforementioned treating agents, materials to be treated are, for example, passed through heating furnaces to thermoset the treating agents. Therefore, it is impossible to say that the productivity is sufficient.

SUMMARY OF THE INVENTION

OBJECT OF THE INVENTION

An object of the present invention is to provide a curable treating agent and a curing treatment process which provide excellent results with regard to any of heat resistance, water resistance, surface physical properties, and impregnability, and further, involve high productivity.

DISCLOSURE OF THE INVENTION

To solve the above problems, the present inventor studied about (i) excellent curable treating agents and curing treatment processes other than conventional thermosetting types and (ii) excellent curable treating agents and curing treatment processes in conventional thermosetting types.

Specifically, the inventor diligently studied first about electron beam curing as (i) above.

Electron beam curing is known as a curing process which is applicable to radical polymerization. This curing process enables the irradiation of very high energy and therefore completes curing in a short time. On the other hand, in cases where cellulosic substrates typified by wood are modified, what has a hydrophilic functional group is preferable as the above treating agent, and examples of those which can be cured with the above electron beam include HEMA (2-hydroxyethyl methacrylate) and HEA (2-hydroxyethyl acrylate). However, they have demerits as follows. The HEMA does not have sufficient curability with electron beams although it has a high effect upon the surface hardness enhancement. On the other hand, the HEA is inferior with regard to the surface hardness enhancement effect and the heat resistance enhancement effect although it has high curability with electron beams. Thus, the inventor studied about excellent electron-beam-curable treating agents and electron beam curing treatment processes which do not have the above demerits and, from this study, the inventor came up with an idea about an electron-beam-curable treating agent comprising a specific amount of high boiling point resin and, as a result, completed the present invention by finding that the above problems can be solved by an electron-beam-curable treating agent which involves the use of a large amount of radical-polymerizable component as a high boiling point resin component and includes a compound of general formula (1) below as this high boiling point radical-polymerizable component, and further that the above problems can be solved if a treating agent including a compound of general formula (1) below is used and if electron beam irradiation conditions are specified.

In addition, from the study about (ii) above, the inventor found that all the above problems can be solved by a resin composition comprising a radical-polymerizable component in a specific ratio wherein the radical-polymerizable component includes a specific heat-radical-polymerizable compound and a specific resin in specific ratios respectively wherein the specific resin has a polymerizable unsaturated double bond which is directly linked to an ester bond. As a result, the inventor completed the present invention.

Incidentally, general formula (1) is:

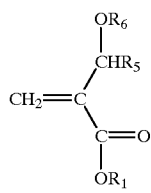
(1)

wherein:
$R_1$ is a hydrogen atom, an alkyl group with 1~18 carbon atoms, a cycloalkyl group with 3~10 carbon atoms, an aryl group, a hydroxyalkyl group with 1~8 carbon atoms, a —$(CH_2)_m NR_2 R_3$ group, or a —$(C_2H_4O)_n R_4$ group, wherein: $R_2$ and $R_3$ are linear or branched alkyl groups with 1~8 carbon atoms; is a linear or branched alkyl group with 1~18 carbon atoms; m is an integer of 2~5; and n is an integer of 1~80;
$R_5$ is a hydrogen atom, an alkyl group with 1~12 carbon atoms, a cycloalkyl group with 3~10 carbon atoms, an aryl group, a hydroxyalkyl group with 1~12 carbon atoms, or an oxirane group with 2~8 carbon atoms; and
$R_6$ is a hydrogen atom,

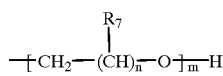

wherein:
$R_7$ is a hydrogen atom or organic residue;
n is an integer of 1~3; and
m is an integer of 1~100,

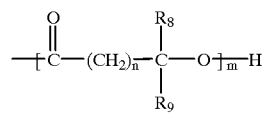

wherein:
each of $R_8$ and $R_9$ is independently a hydrogen atom or organic residue;
n is an integer of 0~5; and
m is an integer of 1~100, or

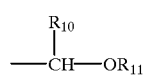

wherein:
$R_{10}$ is a hydrogen atom, an alkyl group with 1~6 carbon atoms, a cycloalkyl group with 3~8 carbon atoms, or an aryl group with 6~18 carbon atoms; and
$R_{11}$ is an alkyl group with 1~18 carbon atoms, a cycloalkyl group with 3~8 carbon atoms, an aryl group with 6~18 carbon atoms, or a —$(CHR_{12}CH_2O)_m R_{13}$ group, wherein: $R_{12}$ is a hydrogen atom or a methyl group; $R_{13}$ is a hydrogen atom, an alkyl group with 1~6 carbon atoms, a cycloalkyl group with 3~8 carbon atoms, or an aryl group with 6~18 carbon atoms; and m is an integer of 1~4.

That is to say, an electron-beam-curable treating agent, according to the present invention, comprises a high boiling point resin in a ratio of not lower than 10 weight % and is used for a cellulosic substrate, and is characterized in that the high boiling point resin includes a high boiling point radical-polymerizable component in a ratio of higher than 90 weight %, wherein the high boiling point radical-polymerizable component includes a compound of general formula (1) above in a ratio of not lower than 5 weight %.

In addition, an electron beam curing treatment process, according to the present invention, is characterized by comprising the steps of impregnating and/or coating a treating agent to a material to be treated and then irradiating the impregnated and/or coated material with an electron beam of 50~500 kV in acceleration voltage and 10~1,000 kGy in dose, wherein the treating agent includes a compound of general formula (1) above.

The compound of general formula (1) above has good impregnability into cellulosic materials, and further has high curability with electron beams.

As to this compound, the present applicant proposed adding it to amino resins for the purpose of solving problems which occur when using the amino resins as high boiling point resin components (JP-A-10-158471). In addition, methyl α-hydroxymethylacrylate, which is one of compounds of general formula (1) above, is proposed as a polymerizable component having good impregnability into cellulosic materials (JP-A- 11-114914). However, any of these proposed treating agents is used for thermosetting, and is not effective for electron beam curing.

It has not been known so far that HEMA and HEA have problems of exhibiting the aforementioned merit and demerit, or that the compound of general formula (1) above is excellent in the electron beam curability, and further, can enhance both surface hardness and heat resistance.

In addition, a heat-radical-curable resin composition, according to the present invention, comprises a radical-polymerizable component in a ratio of higher than 90 weight %, and is characterized in that the radical-polymerizable component includes a compound of general formula (1) above in a ratio of not lower than 5 weight % and further includes at least one member selected from the group consisting of unsaturated polyesters, epoxy (meth)acrylates, polyester (meth)acrylates, urethane (meth)acrylates, and crosslinkable (meth)acrylic polymers in a ratio of not lower than 5 weight %, wherein the at least one member has a polymerizable unsaturated double bond which is directly linked to an ester bond.

In addition, a heat-radical-curable treating agent, according to the present invention, is characterized by comprising the above heat-radical-curable resin composition according to the present invention in a ratio of not lower than 5 weight %.

Furthermore, a treatment process, according to the present invention, is characterized by comprising the step of treating a cellulosic substrate with the above heat-radical-curable treating agent according to the present invention.

These and other objects and the advantages of the present invention will be more fully apparent from the following detailed disclosure.

DETAILED DESCRIPTION OF THE INVENTION (Electron-beam-curable treating agent):

The electron-beam-curable treating agent, according to the present invention, comprises a high boiling point resin in a ratio of not lower than 10 weight % and is used for a cellulosic substrate, and is characterized in that the high boiling point resin includes a high boiling point radical-polymerizable component in a ratio of higher than 90 weight %, wherein the high boiling point radical-polymerizable component includes a compound of general formula (1) above in a ratio of not lower than 5 weight %.

The compound of general formula (1) above has radical polymerizability and therefore exhibits high curability with electron beams. However, in cases where the amount of the compound of general formula (1) above is small, it is preferable to add another radical-polymerizable component. For enhancing the electron beam curability, it is necessary that the high boiling point radical-polymerizable component, including the compound of general formula (1) above, comprises more than 90 weight % of the high boiling point resin component. However, a nonradical-polymerizable component may comprise less than 10 weight % of the above high boiling point resin component.

Hereinafter, the components of the above electron-beam-curable treating agent are explained in detail.

The high boiling point resin, which is included as an essential component in the electron-beam-curable treating agent according to the present invention, is a polymerizable component comprising at least one member selected from the group consisting of unsaturated-group-containing polymers (conceptually including oligomers and macromonomers) having high boiling points and polymerizable monomers having high boiling points, wherein the high boiling point means that the boiling point is preferably not lower than 120° C., more preferably not lower than 150° C., under normal pressure, but nonvolatility at normal temperature may be said to be the high boiling point. In addition, the treating agent according to the present invention comprises the high boiling point resin in a ratio of not lower than 10 weight %.

The high boiling point radical-polymerizable component, which is included as an essential component in the electron-beam-curable treating agent according to the present invention, needs to include the compound of general formula (1) above in a ratio of not lower than 5 weight %, preferably not lower than 30 weight %, more preferably not lower than 50 weight %, most preferably not lower than 70 weight %.

When $R_6$ in general formula (1) above is a hydrogen atom, specific examples of the compound of general formula (1) above include alkyl α-hydroxyalkylacrylates such as methyl α-hydroxymethylacrylate, ethyl α-hydroxymethylacrylate, n-butyl α-hydroxymethylacrylate, 2-ethylhexyl α-hydroxymethylacrylate, methyl α-(1-hydroxyethyl)acrylate, ethyl α-(1-hydroxyethyl)acrylate, and 2-ethylhexyl α-(1-hydroxyethyl)acrylate. Particularly preferable ones among these compounds are methyl α-hydroxymethylacrylate, ethyl α-hydroxymethylacrylate, n-butyl α-hydroxymethylacrylate, and 2-ethylhexyl α-hydroxymethylacrylate in respect to more obtaining the effects of the present invention.

When $R_6$ in general formula (1) above is shown by general formula (2) below, the compound of general formula (1) above is not especially limited, but the repeating structure of an oxyalkylene group shown by —CH$_2$(CHR$_7$)$_n$O— has the following structure. The substituent shown by $R_7$ above may be a hydrogen atom or organic residue independently every oxyalkylene group, and these oxyalkylene groups may be bonded to each other either in block form or at random. A hydrogen atom, a methyl group, and an ethyl group are preferable as $R_7$. In addition, the substituent shown by $R_1$ is preferably an alkyl group with 1~18 carbon atoms, and the substituent shown by $R_5$ is preferably a hydrogen atom.

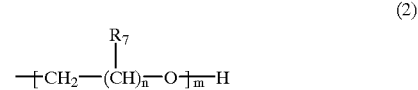

(2)

wherein:
$R_7$ is a hydrogen atom or organic residue;
n is an integer of 1~3; and
m is an integer of 1~100.

When $R_6$ in general formula (1) above is shown by general formula (3) below, the compound of general formula (1) above is not especially limited, but the substituent shown by $R_1$ is preferably an alkyl group with 1~8 carbon atoms, and the substituents shown by $R_5$, $R_8$, and $R_9$ are preferably hydrogen atoms, and n is preferably 4.

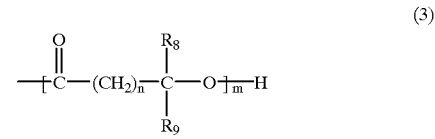

(3)

wherein:
each of $R_8$ and $R_9$ is independently a hydrogen atom or organic residue;
n is an integer of 0~5; and
m is an integer of 1~100.

When $R_6$ in general formula (1) above is shown by general formula (4) below, the compound of general formula (1) above is not especially limited, but the substituent shown by $R_1$ is preferably an alkyl group with 1~8 carbon atoms, and the substituent shown by $R_5$ is preferably a hydrogen atom, and the substituent shown by $R_{10}$ is preferably a hydrogen atom, and the substituent shown by $R_{11}$ is preferably a hydrogen atom or alkyl group with 1~6 carbon atoms.

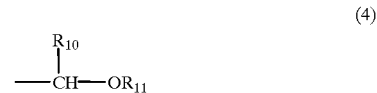

(4)

wherein:
$R_{10}$ is a hydrogen atom, an alkyl group with 1~6 carbon atoms, a cycloalkyl group with 3~8 carbon atoms, or an aryl group with 6~18 carbon atoms; and
$R_{11}$ is an alkyl group with 1~18 carbon atoms, a cycloalkyl group with 3~8 carbon atoms, an aryl group with 6~18 carbon atoms, or a —(CHR$_{12}$CH$_2$O)$_m$R$_{13}$ group, wherein: $R_{12}$ is a hydrogen atom or a methyl group; $R_{13}$ is a hydrogen atom, an alkyl group with 1~6 carbon atoms, a cycloalkyl group with 3~8 carbon atoms, or an aryl group with 6~18 carbon atoms; and m is an integer of 1~4.

The compound of general formula (1) above, as used in the present invention, preferably has a hydroxyl group, and further, preferably has a boiling point of not lower than 200° C. under normal pressure.

The electron-beam-curable treating agent according to the present invention needs to include the compound of general formula (1) above, but may further include a radical-polymerizable component other than this compound.

The high boiling point radical-polymerizable component, which is included as an essential component in the electron-beam-curable treating agent according to the present invention, needs to include the compound of general formula (1) above in a ratio of not lower than 5 weight %, but may further include a high boiling point radical-polymerizable component other than this compound.

This high boiling point radical-polymerizable component is not especially limited if it comprises at least one member selected from the group consisting of radical-polymerizable unsaturated-group-containing polymers (conceptually including oligomers and macromonomers) having high boiling points and radical-polymerizable monomers having high boiling points. But examples of the radical-polymerizable unsaturated-group-containing polymers having high boiling points include vinyl ester resins, unsaturated polyester resins, polyester (meth)acrylates, crosslinkable poly(meth) acrylates, urethane (meth)acrylates, and other radical-polymerizable macromonomers. Examples of the radical-polymerizable monomers having high boiling points include: vinyl monomers such as styrene, vinyltoluene, α-chlorostyrene, α-methylstyrene, 2-vinylpyridine, and divinylbenzene; acrylic compounds such as acrylic acid, 2-ethylhexyl acrylate, n-stearyl acrylate, lauryl/tridecyl acrylate, 2-hydroxyethyl acrylate, 2-hydroxypropyl acrylate, 2-methoxyethyl acrylate, tetraethylene glycol diacrylate, polyethylene glycol diacrylate, polypropylene glycol diacrylate, polyester type diacrylate, pentaerythritol triacrylate, trimethylolpropane triacrylate, tetramethylolmethane tetraacrylate, dipentaerythritol hexaacrylate, dipentaerythritol pentaacrylate mixtures, oligoester acrylate, pentaerythritol acrylate polyfunctional monomers, N-methylolacrylamide, N,N'-dimethylacrylamide, diacetoneacrylamide, lauryl methacrylate, tridecyl methacrylate, stearyl methacrylate, $C_{12}$~$C_{13}$-alkyl methacrylate, $C_{12}$~$C_{13}$-alkyl acrylate, 2-hydroxyethyl methacrylate, hydroxypropyl methacrylate, polyethylene glycol monomethacrylate, polypropylene glycol monomethacrylate, 2-ethoxyethyl methacrylate, tetrahydrofurfuryl methacrylate, allyl methacrylate, glycidyl methacrylate, polyethylene glycol dimethacrylate, dipropylene glycol dimethacrylate, polypropylene glycol dimethacrylate, trimethylolethane trimethacrylate, trimethylolpropane trimethacrylate, mixtures of tetramers of dimethylaminoethyl methacrylate, mixtures of tetramers of dimethylaminoethyl methacrylate/methyl chloride, mixtures of tetramers of dimethylaminoethyl methacrylate/dimethyl sulfate, allyl glycidyl ether, N-methylolmethacrylamide, and 2,2-bis(4-methacryloxypolyethoxyphenyl)propane; and other radical-polymerizable substituted ethylene compounds.

The electron-beam-curable treating agent according to the present invention comprises the high boiling point resin in a ratio of not lower than 10 weight %, and this high boiling point resin includes the high boiling point radical-polymerizable component as an essential component, and, as is mentioned above, this high boiling point radical-polymerizable component needs to include the compound of general formula (1) in a ratio of not lower than 5 weight % and, if necessary, may further include a high boiling point radical-polymerizable component other than this compound. However, the above high boiling point resin may further include a nonradical-polymerizable component having a high boiling point.

The above nonradical-polymerizable component having a high boiling point is not especially limited, but examples thereof include poly(methyl (meth)acrylate), polypropylene glycol, polyethylene glycol, melamine resins, and polyesters.

As is mentioned above, the electron-beam-curable treating agent according to the present invention includes the high boiling point resin as an essential component, but, if necessary, may further include a polymerizable component having no high boiling point. This polymerizable component having no high boiling point is not especially limited, but examples thereof include common radical-polymerizable monomers such as methyl acrylate, ethyl acrylate, methyl methacrylate, and ethyl methacrylate.

Furthermore, if necessary, the electron-beam-curable treating agent according to the present invention may further comprise a solvent. The inclusion of the solvent easily improves the workability in the step of impregnating or coating the treating agent to substrates, and further, easily enhances the effects of the present invention in cases where the impregnating or coating step has been carried out. The solvent is not especially limited, but examples thereof include: glycol ethers such as ethylene glycol monomethyl ether, ethylene glycol monoethyl ether, and ethylene glycol monobutyl ether; glycol ether acetates such as ethylene glycol monomethyl ether acetate and ethylene glycol monoethyl ether acetate; aromatic hydrocarbons such as toluene and xylene; ketones such as methyl ethyl ketone and cyclohexanone; and acetate esters such as ethyl acetate and butyl acetate. These solvents may be used either alone respectively or in combinations with each other. Furthermore, at least one high boiling point solvent may be added to the above solvents, and examples of the high boiling point solvent include N-methylformamide, N,N-dimethylformamide, N-methylformanilide, N-methylacetoamide, N,N-dimethylacetoamide, N-methylpyrrolidone, dimethyl sulfoxide, benzyl ethyl ether, dihexyl ether, acetonylacetone, isophorone, caproic acid, caprylic acid, 1-octanol, 1-nonanol, benzyl alcohol, benzyl acetate, ethyl benzoate, diethyl oxalate, γ-butyrolactone, ethylene carbonate, propylene carbonate, and phenyl cellosolve acetate.

The electron-beam-curable treating agent according to the present invention may further comprise additives such as photosensitive initiators and sensitizers for the purpose of enhancing the electron beam curability.

Yet, if necessary, the electron-beam-curable treating agent according to the present invention may further comprise other additives such as pigments, dyes, antioxidants, and ultraviolet absorbents.

The material to be treated by the electron beam curing treatment process according to the present invention is not especially limited, and it may be a material other than the cellulosic ones, but main examples of the material to be treated include: cellulosic materials such as wood plates, dressing paper, laminated plywood, wood chips, and woody fibers; plastics; metals; glass; and ceramics.

(Electron beam curing treatment):

The electron beam curing treatment process, according to the present invention, is characterized by comprising the steps of impregnating and/or coating a treating agent to a material to be treated and then irradiating the impregnated and/or coated material with an electron beam of 50~500 kV in acceleration voltage and 10~1,000 kGy in dose, wherein the treating agent includes a compound of general formula (1) above.

When the electron beam curing treatment process according to the present invention is carried out, it is important that the conditions for irradiation of electron beams are kept in the specific ranges, namely, 50~500 kV in acceleration voltage and 10~1,000 kGy in dose. In addition, the acceleration voltage is preferably in the range of 200~500 kV. In cases where the acceleration voltage is lower than 50 kV, the treating agent as impregnated into the material to be treated cannot sufficiently be cured. In cases where the acceleration voltage is higher than 500 kV, almost the entirety of the electron beam passes through the material to be treated, therefore there are problems of bad efficiency. In cases where the dose is less than 10 kGy, the treating agent cannot sufficiently be cured and, in cases where the dose is more than 1,000 kGy, there are problems in that the material to be treated becomes deteriorated.

Incidentally, if the treating agent has the aforementioned constitution, the treating agent is curable even with other radiations (e.g. infrared rays, visible rays, ultraviolet rays, X-rays, α-rays, γ-rays, β-rays) by adding initiators or sensitizers suitable for respective radiations if necessary. In addition, it is also possible that the treating agent is cured by combining the electron beam with other radiations.

A description is hereinafter made in a little detail about a case where the material to be treated is a cellulosic material and is a surface-dressing material for substrates such as plywood, metal plates, and glass plates.

In the above case, the surface-dressing material is impregnated and/or coated with the treating agent, and then laminated onto a substrate, and then subjected to the aforementioned electron beam irradiation, or the above surface-dressing material as impregnated and/or coated with the treating agent is subjected to the aforementioned electron beam irradiation and then let to adhere to a substrate.

The amount of the treating agent, as impregnated or coated to the surface-dressing material, is different according to the quality or thickness of the material to be treated, and is therefore not especially limited, but, for example, in cases of woody materials of 0.2 mm in thickness, the amount of the treating agent is in the range of 1~20 g/shaku$^2$ (1 shaku$^2$=(0.303×0.303) m$^2$).

The acceleration voltage of the electron beam is preferably adjusted according to factors such as thickness of the material to be treated. For example, if relations between the acceleration voltage and the transmittance depth are specifically exemplified, in cases where the surface-dressing material is a wood plate, the electron beam irradiation conditions are preferably as follows: the acceleration voltage is not lower than 175 kV when the thickness of the wood plate is 0.1 mm; the acceleration voltage is not lower than 225 kV when the thickness of the wood plate is 0.2 mm; and the acceleration voltage is not lower than 300 kV when the thickness of the wood plate is 0.4 mm.

When wood chips of particle boards or cellulose fibers of fiber boards are treated, the treating agent serves both as a modifier and binder for the wood chips or cellulose fibers.

In addition, the treating agent is usable not only for cellulosic materials, but also for other materials such as plastics, metals, glass, and ceramics. Incidentally, in cases of simple surface coating, the treating agent including the high boiling point polymerizable component may be coated to surfaces of materials to be treated, and then the treating agent may be cured.

In addition, the process according to the present invention enables the treating agent to be impregnated even into almost unprocessed wood and then cured.

(Heat-radical-curable resin composition):

The heat-radical-curable resin composition, according to the present invention, comprises a radical-polymerizable component in a ratio of higher than 90 weight %, and is characterized in that the radical-polymerizable component includes a compound of foregoing general formula (1) in a ratio of not lower than 5 weight % and further includes at least one member selected from the group consisting of unsaturated polyesters, epoxy (meth)acrylates, polyester (meth)acrylates, urethane (meth)acrylates, and crosslinkable (meth)acrylic polymers in a ratio of not lower than 5 weight %, wherein the at least one member has a polymerizable unsaturated double bond which is directly linked to an ester bond.

(Compound (1)):

The radical-polymerizable component, which is included as an essential component in the heat-radical-curable resin composition according to the present invention, needs to include the compound of foregoing general formula (1) in a ratio of not lower than 5 weight %, preferably not lower than 10 weight %, more preferably not lower than 15 weight %, most preferably not lower than 20 weight %.

The compound of foregoing general formula (1) is a hydrophilic compound which has very excellent impregnability into cellulosic substrates, and further, exhibits excellent hydrophobicity by thermosetting, therefore the present invention composition which includes the radical-polymerizable component as an essential component including this compound in a ratio of not lower than 5 weight % exhibits excellent impregnability and hydrophobicity when used for substrates. In cases where the ratio of the compound of general formula (1) is lower than 5 weight %, there are disadvantages in that neither impregnability nor hydrophobicity is sufficiently obtained when the composition is used for substrates.

The saturated vapor pressure of the compound of general formula (1) is merely in an extremely small or almost ignorable degree, for example, when compared with those of components such as styrene included in conventional resin compositions. Therefore, the compound of general formula (1) gives out merely a weak odor or feels little odorous, when compared with the components such as styrene.

Incidentally, the synthetic method for the compound of general formula (1) is not especially limited.

In addition, specific examples and other explanations of the compound of general formula (1) are the same as those mentioned in the preceding explanation of the electron-beam-curable treating agent.

(Specific resin having polymerizable unsaturated double bond which is directly linked to ester bond):

The radical-polymerizable component, which is included as an essential component in the heat-radical-curable resin composition according to the present invention, further needs to include at least one member selected from the group consisting of unsaturated polyesters, epoxy (meth)acrylates, polyester (meth)acrylates, urethane (meth)acrylates, and crosslinkable (meth)acrylic polymers in a ratio of not lower than 5 weight %, preferably not lower than 10 weight %, more preferably not lower than 20 weight %, most preferably not lower than 30 weight %, wherein the at least one member has a polymerizable unsaturated double bond which is directly linked to an ester bond.

Because of specific structures, the unsaturated polyesters, the epoxy (meth)acrylates, the polyester (meth)acrylates, the urethane (meth)acrylates, and the crosslinkable (meth)acrylic polymers, having a polymerizable unsaturated double bond which is directly linked to an ester bond, exhibit high heat-radical-curability and give the resulting polymers strong frameworks and excellent heat resistance. Furthermore, in the present invention, the above specific resins are used jointly with the specific compound of foregoing general formula (1) in the specific ratios, therefore substrates as treated with the present invention composition have excellent surface physical properties or surface material feel. Particularly as to the surface hardness, excellent performance can be given. Accordingly, the present invention composition, which includes the radical-polymerizable component as an essential component including at least one of the above specific resins in a ratio of not lower than 5 weight %, exhibits excellent heat resistance and surface physical properties when used for substrates. In cases where the ratio of the above specific resins is lower than 5 weight %, there are disadvantages in that neither heat resistance nor surface physical property is sufficiently obtained.

The unsaturated polyester, usable in the present invention, is easily obtainable by a process including the step of carrying out a condensation reaction of a dibasic acid (including an α,β-unsaturated dibasic acid and/or anhydride thereof) and a polyhydric alcohol.

Specific examples of the above dibasic acid include: α,β-unsaturated dibasic acids and anhydrides thereof, such as maleic acid, maleic anhydride, fumaric acid, itaconic acid, and itaconic anhydride; and saturated dibasic acids and anhydrides thereof, such as phthalic acid, phthalic anhydride, isophthalic acid, terephthalic acid, tetrahydrophthalic acid, tetrahydrophthalic anhydride, hexahydrophthalic acid, hexahydrophthalic anhydride, cyclohexanedicarboxylic acid, succinic acid, malonic acid, glutaric acid, adipic acid, azelaic acid, and sebacic acid, 1,12-dodecanedioic acid, dimer acids, 2,6-naphthalenedicarboxylic acid, 2,7-naphthalenedicarboxylic acid, 2,3-naphthalenedicarboxylic acid, 2,3-naphthalenedicarboxylic anhydride, and 4,4'-biphenyldicarboxylic acid. However, there is no especial limitation thereto.

The dibasic acid is not limited if it includes the α,β-unsaturated dibasic acid and/or anhydride thereof. The α,β-unsaturated dibasic acids and/or anhydrides thereof (hereinafter referred to as α,β-unsaturated dibasic acid compounds) may be used either alone respectively or in combinations with each other. The saturated dibasic acids and anhydrides thereof (hereinafter referred to as saturated dibasic acid compounds) are used jointly with the α,β-unsaturated dibasic acid compounds, if necessary. When the saturated dibasic acid compounds are used jointly with the α,β-unsaturated dibasic acid compounds, the saturated dibasic acid compounds may be used either alone respectively or in combinations with each other. In addition, when the saturated dibasic acid compounds are used jointly with the α,β-unsaturated dibasic acid compounds, the ratio of the α,β-unsaturated dibasic acid compounds in the total dibasic acid compounds is in the range of 0~100 mol % both exclusive, preferably 15~100 mol % exclusive of 100 mol %.

Specific examples of the above polyhydric alcohol include: ethylene glycol, diethylene glycol, triethylene glycol, tetraethylene glycol, propylene glycol, dipropylene glycol, 1,3-butanediol, 1,4-butanediol, 1,5-pentanediol, 1,6-hexanediol, neopentyl glycol, 1,2-cyclohexanediol, 1,3-cyclohexanediol, 1 4-cyclohexanediol, 1,4-cyclohexanedimethanol, 2-methylpropane-1,3-diol, trimethylolpropane, hydrogenated bisphenol A, and bisphenol A-alkylene oxide (e.g. ethylene oxide, propylene oxide) adducts. However, there is no especial limitation thereto. These compounds may be used either alone respectively or in combinations with each other. The ratio of the polyhydric alcohol to the dibasic acid is not especially limited.

The unsaturated polyester is produced from the condensation reaction of the above dibasic acid and the above polyhydric alcohol. When both reactants are allowed to run the condensation reaction, the reaction method or factors such as reaction conditions are not especially limited, but it is preferable to set the reaction temperature and the reaction time such that the condensation reaction can be completed. In addition, in this reaction, catalysts to promote the condensation reaction or additives such as defoamers can be let to coexist in the reaction system, if necessary. The amount of the catalyst or additive, as used, is not especially limited. Incidentally, the mixing order of materials such as dibasic acid, polyhydric alcohol, and catalyst is not especially limited. In addition, more preferably, the condensation reaction is carried out under inert gas atmosphere such as nitrogen or helium.

The unsaturated polyester is obtained by the above process. The unsaturated polyesters may be used either alone respectively or in combinations with each other. The number-average molecular weight (Mn) of the unsaturated polyester is preferably in the range of 500~6,000. An unsaturated polyester of which the number-average molecular weight is higher than 6,000 would have such a high viscosity that the handling property of this unsaturated polyester or a resin composition containing it might be deteriorated.

The epoxy (meth)acrylate, usable in the present invention, is easily obtainable by a process including the step of carrying out an esterification reaction of a polyfunctional epoxy compound having at least two epoxy groups in its molecule and an unsaturated monobasic acid, and further, if necessary, a polybasic acid, in the presence of an esterification catalyst.

Examples of the above polyfunctional epoxy compound include bisphenol type epoxy compounds, hydrogenated bisphenol type epoxy compounds, novolac type epoxy compounds, hydrogenated novolac type epoxy compounds, and halogenated epoxy compounds which are obtained by displacing a part of hydrogen atoms of the above bisphenol type epoxy compounds or novolac type epoxy compounds with halogen atoms such as bromine atoms and chlorine atoms. However, there is no especial limitation thereto. These compounds may be used either alone respectively or in combinations with each other.

Specific examples of the bisphenol type epoxy compound include: a glycidyl ether type epoxy compound which is a product from a reaction of epichlorohydrin or methylepichlorohydrin with bisphenol A or bisphenol F; and an epoxy compound which is a product from a reaction of epichlorohydrin or methylepichlorohydrin with a bisphenol A-alkylene oxide adduct. However, there is no especial limitation thereto.

Specific examples of the hydrogenated bisphenol type epoxy compound include: a glycidyl ether type epoxy compound which is a product from a reaction of epichlorohydrin or methylepichlorohydrin with hydrogenated bisphenol A or hydrogenated bisphenol F; and an epoxy compound which is a product from a reaction of epichlorohydrin or methylepichlorohydrin with a hydrogenated bisphenol A-alkylene oxide adduct. However, there is no especial limitation thereto.

Specific examples of the novolac type epoxy compound include an epoxy compound which is a product from a reaction of epichlorohydrin or methylepichlorohydrin with phenol novolac or cresol novolac. However, there is no especial limitation thereto.

Specific examples of the hydrogenated novolac type epoxy compound include an epoxy compound which is a product from a reaction of epichlorohydrin or methylepichlorohydrin with hydrogenated phenol novolac or hydrogenated cresol novolac. However, there is no especial limitation thereto.

The average epoxy equivalent of the polyfunctional epoxy compound is not especially limited, but is preferably in the range of 150~900, particularly preferably 150~500. An epoxy (meth)acrylate which is obtained from a polyfunctional epoxy compound of which the average epoxy equivalent is higher than 900 might have such a high viscosity that the handling property of this epoxy (meth)acrylate or a resin composition containing it might be deteriorated.

The above unsaturated monobasic acid is a monobasic acid having at least one radical-polymerizable double bond in its molecule. Specific examples of the unsaturated monobasic acid include acrylic acid, methacrylic acid, cinnamic acid, crotonic acid, sorbic acid, and half esters of unsaturated dibasic acids. However, there is no especial limitation thereto. In addition, specific examples of the above half ester include monomethyl maleate, monopropyl maleate, and monobutyl maleate. However, there is no especial limitation thereto. These compounds may be used either alone respectively or in combinations with each other. Preferable ones among the above-exemplified compounds are acrylic acid and methacrylic add, because these are easily available.

The above polybasic acid is not limited if it is a compound having at least two carboxyl groups in its molecule. Specific examples of the polybasic acid include the above-exemplified dibasic acids and trimellitic anhydride. However, there is no especial limitation thereto. These compounds may be used, if necessary.

The ratio of the polyfunctional epoxy compound to the unsaturated monobasic acid and the polybasic acid is not especially limited, but may be set such that the ratio of the epoxy group in the polyfunctional epoxy compound to the total carboxyl group in the unsaturated monobasic acid and the polybasic acid can be in the range of 1:1.2~1.2:1.

Specific examples of the esterification catalyst include: tertiary amines such as triethylamine, N,N-dimethylbenzylamine, N,N-dimethylaniline; quaternary ammonium salts such as trimethylbenzylammonium chloride and pyridinium chloride; phosphonium compounds such as triphenylphosphine, tetraphenylphosphonium chloride, tetraphenylphosphonium bromide, and tetraphenylphosphonium iodide; sulfonic acids such as p-toluenesulfonic acid; organometallic salts such as zinc octenoate. However, there is no especial limitation thereto, and common esterification catalysts are usable. These compounds may be used either alone respectively or in combinations with each other. The amount of the esterification catalyst, as used, is not especially limited.

The epoxy (meth)acrylate is produced from the esterification reaction of the polyfunctional epoxy compound and the unsaturated monobasic acid, and further, if necessary, the polybasic acid, in the presence of the esterification catalyst. When the esterification reaction is run, the reaction method or factors such as reaction conditions are not especially limited. In addition, in the esterification reaction, it is preferable to add polymerization inhibitors or molecular oxygen to the reaction system for the purpose of inhibiting the gelation caused by polymerization of materials such as polyfunctional epoxy compound and unsaturated monobasic acid. Incidentally, the mixing order of the polyfunctional epoxy compound, the unsaturated monobasic acid, the polybasic acid, and the esterification catalyst is not especially limited.

Specific examples of the polymerization inhibitor include hydroquinone, methylhydroquinone, p-t-butylcatechol, 2-t-butylhydroquinone, toluhydroquinone, p-benzoquinone, naphthoquinone, methoxyhydroquinone, hydroquinone monomethyl ether, phenothiazine, and copper naphthenate. However, there is no especial limitation thereto. These compounds may be used either alone respectively or in combinations with each other. In addition, for sufficiently inhibiting the above gelation, it is particularly preferable to jointly use the polymerization inhibitor and the molecular oxygen.

The epoxy (meth)acrylate is obtained by the above process. The epoxy (meth)acrylates may be used either alone respectively or in combinations with each other. The number-average molecular weight of the epoxy (meth)acrylate is preferably in the range of 900~5,000, more preferably 1,300~2,500. A resin composition containing an epoxy (meth)acrylate with a number-average molecular weight of lower than 900 might exhibit low surface driability when cured, and further, the physical properties such as mechanical strength of a cured product of such a resin composition might be deteriorated. On the other hand, an epoxy (meth)acrylate of which the number-average molecular weight is higher than 5,000 would have such a high viscosity that the handling property of this epoxy (meth)acrylate or a resin composition containing it might be deteriorated, and further, the curability of such a resin composition might be bad.

The polyester (meth)acrylate, usable in the present invention, is easily obtainable by a process including the step of carrying out an esterification reaction of a saturated polyester or the above unsaturated polyester with a (meth)acryloyl-group-containing compound. The number-average molecular weight of the above saturated or unsaturated polyester is preferably in the range of 500~3,000. A polyester (meth)acrylate which is obtained from a saturated or unsaturated polyester of which the number-average molecular weight is higher than 3,000 might have such a very high viscosity that the handling property of this polyester (meth)acrylate or a resin composition containing it might be deteriorated. Incidentally, the saturated polyester is easily obtainable by a process including the step of carrying out a condensation reaction of the aforementioned saturated dibasic acid compound and the aforementioned polyhydric alcohol. The reaction method or factors, such as reaction conditions, for obtaining the saturated polyester are the same as those for obtaining the unsaturated polyester.

The above (meth)acryloyl-group-containing compound is a compound to esterify with a terminal hydroxyl or carboxyl group of the saturated or unsaturated polyester. Specifically, the (meth)acryloyl-group-containing compound includes the aforementioned unsaturated monobasic acid to react with the terminal hydroxyl group and an unsaturated glycidyl ester compound to react with the terminal carboxyl group. Specific examples of the unsaturated glycidyl ester compound include glycidyl (meth)acrylate and allyl glycidyl ether. However, there is no especial limitation thereto. These compounds may be used either alone respectively or in combinations with each other. The ratio of the (meth)acryloyl-group-containing compound to the saturated or unsaturated polyester is not especially limited.

The polyester (meth)acrylate is produced from the esterification reaction of the saturated or unsaturated polyester and the (meth)acryloyl-group-containing compound. When the esterification reaction is run, the reaction method or factors such as reaction conditions are not especially limited, but it is preferable to set the reaction temperature and the reaction time such that the esterification reaction can be completed. In addition, in this reaction, it is preferable to use the aforementioned esterification catalyst to promote the reaction. The amount of the esterification catalyst, as used, is not especially limited. Furthermore, in the esterification reaction, it is preferable to add the aforementioned polymerization inhibitor or molecular oxygen to the reaction system for the purpose of inhibiting the gelation caused by polymerization.

In addition, when the esterification reaction is run, a solvent may be used, if necessary. Specific examples of the solvent include aromatic hydrocarbons such as toluene, but the solvent is not especially limited unless it hinders the above reaction. The amount of the solvent as used or the method for removing the solvent is not especially limited. Incidentally, in the above esterification reaction, water or alcohol forms as a by-product. Therefore, for promoting the reaction, it is preferable to remove the by-product such as water or alcohol from the reaction system. The removal method therefor is not especially limited.

The polyester (meth)acrylate is obtained by the above process. The polyester (meth)acrylates may be used either alone respectively or in combinations with each other.

The urethane (meth)acrylate, usable in the present invention, is, for example, easily obtainable by a process including the step of carrying out a urethanization reaction of a polyisocyanate compound and a hydroxyl-group-containing (meth)acrylate compound, or a urethanization reaction of a polyisocyanate compound, a polyol compound, and a hydroxyl-group-containing (meth)acrylate compound, or a urethanization reaction of a polyol compound and an unsaturated isocyanate compound.

Specific examples of the above polyisocyanate compound include: 2,4-tolylene diisocyanate and hydrogenated products thereof, isomers of 2,4-tolylene diisocyanate and hydrogenated products of these isomers, diphenylmethane diisocyanate, hydrogenated diphenylmethane diisocyanate, hexamethylene diisocyanate, trimers of hexamethylene diisocyanate, isophorone diisocyanate, xylene diisocyanate, hydrogenated xylene diisocyanate, dicyclohexylmethane diisocyanate, tolidine diisocyanate, naphthalene diisocyanate, triphenylmethane triisocyanate; or Millionate MR, Colonate L (trade names, both are made by Nippon Polyurethane Kogyo Co., Ltd.); Barnock D-750, Krisbon NX (trade names, both are made by Dainippon Ink & Chemicals, Inc.); Desmodur L (trade name, made by Sumitomo-Bayer Urethane Co., Ltd.); Takenate D102 (trade name, made by Takeda Pharmaceutical Co., Ltd.). However, there is no especial limitation thereto. These compounds may be used either alone respectively or in combinations with each other. Preferable ones among the above-exemplified compounds are the diisocyanate compounds.

The above hydroxyl-group-containing (meth)acrylate compound is not limited if it is a (meth)acrylate compound with at least one hydroxyl group in its molecule. Specific examples thereof include 2-hydroxyethyl (meth)acrylate, 2-hydroxypropyl (meth)acrylate, 3-hydroxybutyl (meth) acrylate, polyethylene glycol mono(meth)acrylate, and polypropylene glycol mono(meth)acrylate. However, there is no especial limitation thereto. These compounds may be used either alone respectively or in combinations with each other.

Specific examples of the above polyol compound include polyetherpolyols, polyesterpolyols, polybutadienepolyols, and bisphenol A-alkylene oxide (e.g. ethylene oxide, propylene oxide) adducts. However, there is no especial limitation thereto. These compounds may be used either alone respectively or in combinations with each other. In addition, the number-average molecular weight of the above polyetherpolyol is preferably in the range of 300~5,000, more preferably 500~3,000. Specific examples of the polyetherpolyol include polyoxyethylene glycol, polyoxypropylene glycol, polytetramethylene glycol, and polyoxymethylene glycol. However, there is no especial limitation thereto. In addition, the number-average molecular weight of the above polyesterpolyol is preferably in the range of 1,000~3,000.

The above unsaturated isocyanate compound is not limited if it is an isocyanate compound with at least one polymerizable unsaturated group (other than the isocyanate group) in its molecule. Specific examples thereof include: methacryloyloxymethyl isocyanate, 2-methacryloyloxyethyl isocyanate; or isocyanate compounds with a (meth)acryloyl group and an isocyanate group, which are obtained by a process including the step of carrying out a urethanization reaction of the aforementioned polyisocyanate compound and the aforementioned hydroxyl-group-containing (meth)acrylate compound in a molar ratio of 1:1. However, there is no especial limitation thereto. These compounds may be used either alone respectively or in combinations with each other.

The urethane (meth)acrylate is produced from the urethanization reaction of the polyisocyanate compound and the hydroxyl-group-containing (meth)acrylate compound, or from the urethanization reaction of the polyisocyanate compound, the polyol compound, and the hydroxyl-group-containing (meth)acrylate compound, or from the urethanization reaction of the polyol compound and the unsaturated isocyanate compound. When the urethanization reaction is run, the reaction method or factors such as reaction conditions are not especially limited, but it is preferable to set the reaction temperature and the reaction time such that the urethanization reaction can be completed. In addition, for example, when the urethanization reaction of the polyisocyanate compound, the polyol compound, and the hydroxyl-group-containing (meth)acrylate compound is carried out, first, a urethanization reaction of the polyisocyanate compound and the polyol compound is carried out under conditions where the ratio of the isocyanate group of the polyisocyanate compound to the hydroxyl group of the polyol compound (isocyanate group/hydroxyl group) is in the range of 3.0~2.0, thereby forming a prepolymer with an isocyanate group at its terminal, and then a urethanization reaction of this prepolymer and the hydroxyl-group-containing (meth)acrylate compound is carried out under conditions where the isocyanate group of the prepolymer and the hydroxyl group of the hydroxyl-group-containing (meth)acrylate compound are almost equivalent to each other.

In addition, in the urethanization reaction, it is preferable to use a urethanization catalyst to promote the reaction. Specific examples thereof include: tertiary amines such as triethylamine; and metal salts such as di-n-butyltin dilaurate. However, there is no especial limitation thereto, and common urethanization catalysts are usable. The amount of the urethanization catalyst, as used, is not especially limited. Furthermore, in the urethanization reaction, it is preferable to add the aforementioned polymerization inhibitor or molecular oxygen to the reaction system for the purpose of inhibiting the gelation caused by polymerization.

The urethane (meth)acrylate is obtained by the above process. The urethane (meth)acrylates may be used either alone respectively or in combinations with each other. The number-average molecular weight of the urethane (meth) acrylate is preferably in the range of 800~8,000, more preferably 1,000~5,000. A resin composition containing a urethane (meth)acrylate with a number-average molecular weight of lower than 800 might exhibit low surface driability when cured, and further, the physical properties such as mechanical strength of a cured product of such a resin composition might be deteriorated. On the other hand, a urethane (meth)acrylate of which the number-average molecular weight is higher than 8,000 would have such a very high viscosity that the handling property of this urethane (meth)acrylate or a resin composition containing it might be deteriorated, and further, the curability of such a resin composition might be bad.

The crosslinkable (meth)acrylic polymer, usable in the present invention, is, for example, easily obtainable by a process including the steps of polymerizing a polymerizable monomer including an unsaturated monobasic acid, and further, if necessary, an unsaturated polybasic acid, in the presence of a polymerization initiator, and then carrying out an esterification reaction of the resultant polymer and a compound having a polymerizable unsaturated group and a reactive group, which is to form an ester bond with an acid group, in its molecule in the presence of an esterification catalyst, or by a process including the steps of polymerizing a polymerizable monomer and a hydroxyl-group-containing polymerizable monomer in the presence of a polymerization initiator, and then carrying out an esterification reaction of the resultant polymer and an unsaturated monobasic acid, and further, if necessary, an unsaturated polybasic acid, in the presence of an esterification catalyst.

Examples of the above polymerizable monomer include: (meth)acrylic acid; (meth)acrylate esters such as methyl (meth)acrylate, n-butyl (meth)acrylate, 2-ethylhexyl (meth) acrylate, lauryl (meth)acrylate, cyclohexyl (meth)acrylate, benzyl (meth)acrylate, methoxyethylene glycol (meth) acrylate, meth oxydiethylene glycol (meth)acrylate, methoxypolyethylene glycol (meth)acrylate, phenoxyethyl (meth)acrylate, and allyl (meth)acrylate; basic (meth) acrylates such as diethylaminoethyl (meth)acrylate; hydroxyl-group-containing (meth)acrylate esters such as 2-hydroxyethyl (meth)acrylate; epoxy-group-containing (meth)acrylate esters such as glycidyl (meth)acrylate; (meth)acrylamides; (meth)acrylic monomers such as (meth) acrylonitrile and (meth)acrolein; styrenic compounds such as styrene and vinyltoluene; vinyl esters such as vinyl acetate; vinyl ethers such as ethyl vinyl ether and butyl vinyl ether; allyl compounds such as allyl alcohol and allyl glycidyl ether; unsaturated monocarboxylic acids such as crotonic acid and monoesters of maleic acid; unsaturated dicarboxylic acids, such as maleic acid, fumaric acid, and itaconic acid, and anhydrides of these acids; unsaturated carboxylic acid esters such as diethyl maleate and diethyl fumarate; and N-substituted maleimides such as N-phenylmaleimide and N-cyclohexylmaleimide. However, there is no especial limitation thereto. These compounds may be used either alone respectively or in combinations with each other.

Examples of the above compound having a polymerizable unsaturated group and a reactive group, which is to form an ester bond with an acid group, in its molecule include glycidyl (meth)acrylate and allyl glycidyl ether. However, there is no especial limitation thereto. These compounds may be used either alone respectively or in combinations with each other. In addition, examples of the above unsaturated monobasic acid and the above unsaturated polybasic acid include the same as the aforementioned ones.

The crosslinkable (meth)acrylic polymer is produced from the esterification reaction of the hydroxyl group of a (meth)acrylic polymer, resultant from the polymerization of the above polymerizable monomer, with the unsaturated monobasic acid, or from the esterification reaction of the carboxyl group of the (meth)acrylic polymer, resultant from the polymerization of the above polymerizable monomer, with the compound having a polymerizable unsaturated group and a reactive group, which is to form an ester bond with an acid group, in its molecule. When the esterification reaction is run, the reaction method or factors such as reaction conditions are not especially limited, but it is preferable to set the reaction temperature and the reaction time such that the esterification reaction can be completed. In addition, in this reaction, it is preferable to use the aforementioned esterification catalyst to promote the reaction. The amount of the catalyst, as used, is not especially limited.

Furthermore, it is preferable to add the aforementioned polymerization inhibitor or molecular oxygen to the reaction system for the purpose of inhibiting the gelation caused by polymerization.

The crosslinkable (meth)acrylic polymer is obtained by the above process. The crosslinkable (meth)acrylic polymers may be used either alone respectively or in combinations with each other. The number-average molecular weight of the crosslinkable (meth)acrylic polymer is preferably in the range of 1,000~1,000,000, more preferably 2,000~50,000. A crosslinkable (meth)acrylic polymer of which the number-average molecular weight is higher than 1,000,000 would have such a high viscosity that the handling property of this crosslinkable (meth)acrylic polymer or a resin composition containing it might be deteriorated.

In the radical-polymerizable component in the present invention, the composition ratio between the compound of foregoing general formula (1) and the foregoing specific resin having a polymerizable unsaturated double bond which is directly linked to an ester bond is as follows: preferably, the compound of general formula (1) is in the range of 5~95 weight %, and the specific resin is in the range of 95~5 weight %; more preferably, the compound of general formula (1) is in the range of 10~90 weight %, and the specific resin is in the range of 90~10 weight %; still more preferably, the compound of general formula (1) is in the range of 20~80 weight %, and the specific resin is in the range of 80~20 weight %; most preferably, the compound of general formula (1) is in the range of 30~80 weight %, and the specific resin is in the range of 70~20 weight %; wherein the entirety of the composition according to the present invention is 100 weight %. This composition ratio is adjustable according to a desired object (e.g. impregnability or workability depending upon factors such as sort of the cellulosic substrate, or physical properties of coating films after being cured).

(Other radical-polymerizable components):

The heat-radical-curable resin composition, according to the present invention, comprises the radical-polymerizable component in a ratio of higher than 90 weight %, and, as is mentioned above, the radical-polymerizable component includes the compound of foregoing general formula (1) in a ratio of not lower than 5 weight % and further includes at least one member selected from the group consisting of unsaturated polyesters, epoxy (meth)acrylates, polyester (meth)acrylates, urethane (meth)acrylates, and crosslinkable (meth)acrylic polymers in a ratio of not lower than 5 weight %, wherein the at least one member has a polymerizable unsaturated double bond which is directly linked to an ester bond. However, besides these indispensable compound and resin, other radical-polymerizable components may further be included in the above radical-polymerizable component.

The above other radical-polymerizable component is not especially limited if it is at least one member selected from the group consisting of radical-polymerizable unsaturatedgroup-containing polymers (conceptually including oligomers and macromonomers) and radical-polymerizable monomers. However, examples of the radical-polymerizable unsaturated-group-containing polymer include polyether (meth)acrylates, polybutadiene acrylates, and other radical-polymerizable macromonomers. In addition, polymers having a vinyl ether group, a propenyl ether group, or an allyl group in place of the (meth)acryloyl group are usable. Examples of the radical-polymerizable monomers include: vinyl monomers such as styrene, vinyltoluene, α-chlorostyrene, α-methylstyrene, 2-vinylpyridine, and divinylbenzene; acrylic compounds such as acrylic acid, 2-ethylhexyl acrylate, n-stearyl acrylate, lauryl/tridecyl acrylate, 2-hydroxyethyl acrylate, 2-hydroxypropyl acrylate, 2-methoxyethyl acrylate, tetraethylene glycol diacrylate, polyethylene glycol diacrylate, polypropylene glycol diacrylate, 1,6-hexanediol diacrylate, polyester type diacrylate, pentaerythritol triacrylate, trimethylolpropane triacrylate, tetramethylolmethane tetraacrylate, dipentaerythritol hexaacrylate, dipentaerythritol pentaacrylate mixtures, oligoester acrylate, pentaerythritol acrylate polyfunctional monomers, N-methylolacrylamide, N,N'-dimethylacrylamide, diacetoneacrylamide, methyl methacrylate, lauryl methacrylate, tridecyl methacrylate, stearyl methacrylate, $C_{12}$~$C_{13}$-alkyl methacrylate, $C_{12}$~$C_{13}$-alkyl acrylate, 2-hydroxyethyl methacrylate, hydroxypropyl methacrylate, polyethylene glycol monomethacrylate, polypropylene glycol monomethacrylate, 2-ethoxyethyl methacrylate, tetrahydrofurfuryl methacrylate, allyl methacrylate, glycidyl methacrylate, polyethylene glycol dimethacrylate, dipropylene glycol dimethacrylate, polypropylene glycol dimethacrylate, trimethylolethane trimethacrylate, trimethylolpropane trimethacrylate, mixtures of tetramers of dimethylaminoethyl methacrylate, mixtures of tetramers of dimethylaminoethyl methacrylate/ methyl chloride, mixtures of tetramers of dimethylaminoethyl methacrylate/dimethyl sulfate, allyl glycidyl ether, N-methylolmethacrylamide, and 2,2-bis(4-methacryloxypolyethoxyphenyl)propane; and other radical-polymerizable substituted ethylene compounds. Preferable ones among the above are: aromatic unsaturated monomers such as styrene and vinyltoluene; and (meth)acrylate monomers such as methyl methacrylate and 2-ethylhexyl acrylate.

The content of the above other radical-polymerizable component is preferably in the range of 0~60 weight %, more preferably 20~50 weight %, wherein the amount of the foregoing specific resin having a polymerizable unsaturated double bond which is directly linked to an ester bond is 100 weight %.

(Heat-radical-curable resin composition):

The heat-radical-curable resin composition, according to the present invention, is characterized by comprising the aforementioned radical-polymerizable component in a ratio of higher than 90 weight %.

That is to say, as to the heat-radical-curable resin composition according to the present invention, it is necessary for exhibiting sufficiently excellent heat-radical-curability that the aforementioned radical-polymerizable component comprises more than 90 weight % of the entire composition. However, a curable component other than the radical-polymerizable component (hereinafter this other curable component is referred to as nonradical-curable component) may comprise less than 10 weight % of the entire composition.

The above nonradical-curable component is not especially limited if it is a curable monomer or polymer component having no radical polymerizability, but examples thereof include: epoxy compounds such as bisphenol A, diglycidyl ether, novolac type epoxy, and alicyclic epoxy; polyol compound/polyisocyanate compound mixtures; compounds having a reactive hydroxyl group, such as active methylol group, at their terminals and/or side chains; phenol compounds; amino resins; and oxazoline-group-containing compounds. The amount of these nonradical-curable components is preferably smaller than 10 weight %, more preferably not larger than 5 weight %, still more preferably not larger than 3 weight %, of the entire composition. These nonradical-curable components cure so slowly that, in cases where they are included in a ratio of not smaller than 10 weight %, there are disadvantages in that portions thereof remain unreacted, therefore sufficient performance cannot be exhibited in respect to, for example, water resistance.

(Heat-radical-curable treating agent):

The heat-radical-curable treating agent, according to the present invention, is characterized by comprising the above heat-radical-curable resin composition according to the present invention in a ratio of not lower than 5 weight %, and, if necessary, may further comprise components such as resins of no curability or solvents.

The above resin of no curability is not especially limited, but examples thereof include: polyolefins such as polyethylene and polypropylene; polyalkylene glycols such as polyethylene glycol and polypropylene glycol; saturated polyesters; polyamides; poly(methyl (meth)acrylate), poly(vinyl ether), poly(vinyl pyrrolidone), acetyl cellulose, and nitrocellulose. These compounds may be used either alone respectively or in combinations with each other. The amount of these resins of no curability, as used, is preferably in the range of 2~40 weight parts, more preferably 4~30 weight parts, per 100 weight parts of the composition according to the present invention.

The above solvent is not especially limited, but examples thereof include: glycol ethers such as ethylene glycol monomethyl ether, ethylene glycol monoethyl ether, and ethylene glycol monobutyl ether; glycol ether acetates such as ethylene glycol monomethyl ether acetate and ethylene glycol monoethyl ether acetate; aromatic hydrocarbons such as toluene and xylene; ketones such as methyl ethyl ketone and cyclohexanone; and acetate esters such as ethyl acetate and butyl acetate. These solvents may be used either alone respectively or in combinations with each other. Furthermore, at least one high boiling point solvent may be added to the above solvents, and examples of the high boiling point solvent include N-methylformamide, N,N-dimethylformamide, N-methylformanilide, N-methylacetoamide, N,N-dimethylacetoamide, N-methylpyrrolidone, dimethyl sulfoxide, benzyl ethyl ether, dihexyl ether, acetonylacetone, isophorone, caproic acid, caprylic acid, 1-octanol, 1-nonanol, benzyl alcohol, benzyl acetate, ethyl benzoate, diethyl oxalate, γ-butyrolactone, ethylene carbonate, propylene carbonate, and phenyl cellosolve acetate. The inclusion of the solvent easily improves the workability in the step of impregnating or coating the treating agent to substrates, and further, might easily enhance the effects of the present invention in cases where the impregnating or coating step has been carried out. Furthermore, the compound (1), which is included as an essential component in the heat-radical-curable treating agent according to the present invention, has so low volatility that the compound (1) can sufficiently remain in cases where the heat-radical-curable treating agent according to the present invention is used (e.g. coated) in a state containing the solvent which is then volatilized. The amount of the above solvent, as used, is not especially limited, but is preferably in the range of 1~50 weight parts, more preferably 3~30 weight parts, per 100 weight parts of the heat-radical-curable resin composition according to the present invention. In addition, the conditions for drying the substrate as coated with the treating agent can be set considering factors such as boiling point of the solvent being used.

In addition, the heat-radical-curable treating agent according to the present invention may further comprise the aforementioned polymerization inhibitors for the purpose of enhancing the preservation stability or adjusting the curability such as curing rate.

In addition, the heat-radical-curable treating agent according to the present invention may further comprise materials such as reinforcements or additives, if necessary, namely, according to the physical properties as demanded to a cured product by curing the resin composition. Examples of the above reinforcement include fibers such as glass fibers, organic fibers (e.g. polyaramid, polyester), and carbon fibers. These fibers are usable in the form of chopped strands, nonwoven fabrics, or woven fabrics. Specific examples of the above additive include inorganic fillers, organic fillers, ultraviolet absorbents, antioxidants, plasticizers, leveling agents, defoamers, antistatic agents, fire retardants, slip additives, thickeners, shrinkage-reducing agents, aggregates, and colorants (e.g. pigments, dyes). In addition, specific examples of the inorganic filler include aluminum hydroxide, calcium carbonate, clay, talc, alumina, and silica. Incidentally, the amount or method of the addition of the above materials such as reinforcements or additives is not especially limited, and may be set fitly according to factors such as use purposes, but, for example, the reinforcement may be used in the range of 50~5,000 weight parts, and the ultraviolet absorbent or antioxidant may be used in the range of 5 ppm~5 weight %, per 100 weight parts of the heat-radical-curable resin composition according to the present invention.

The heat-radical-curable treating agent according to the present invention is easily curable, because its radical polymerization is initiated by heating or at normal temperature. In addition, it is preferable to add a thermosetting type curing agent to the treating agent to mix them when the treating agent is used, in other words, cured. Incidentally, a photocuring type initiator may jointly be used according to use purposes.

Specific examples of the above thermosetting type curing agent include: organic peroxides such as diisopropyl peroxydicarbonate, benzoyl peroxide, methyl ethyl ketone peroxide, cyclohexanone peroxide, t-butyl peroxy-2-ethylhexanoate, 1,1,3,3-tetramethylbutyl peroxy-2-ethylhexanoate, t-amyl peroxy-2-ethylhexanoate, t-butyl hydroperoxide, t-butyl peroxyneodecanoate, t-butyl peroxybenzoate, and cumene hydroperoxide; and azo compounds such as 2,2'-azobisisobutyronitrile and 2,2'-azobisdiethylvaleronitrile. However, there is no especial limitation thereto.

Specific examples of the above photocuring type initiator (photosensitizer) include: benzoin ethers such as benzoin ethyl ether, benzoin isopropyl ether, and benzoin isobutyl ether; benzyl ketals such as dimethoxyphenylacetophenone and 1-hydroxycyclohexyl phenyl ketone; acetophenones such as diethoxyacetophenone; ketones such as benzophenone, benzil, and 2-chlorothioxanthone; anthraquinone; and methylphenyl glyoxylate. However, there is no especial limitation thereto.

These thermosetting type curing agents and photocuring type initiators (hereinafter these might generically be referred to simply as "curing agent(s)") may be used either alone respectively or in combinations with each other. The amount or method of the addition of the curing agent is not especially limited, and may be set fitly according to factors such as composition of the treating agent, but, for example, the curing agent may be added in the range of 0.5~5 weight parts per 100 weight parts of the treating agent.

Furthermore, in cases where the thermosetting type curing agent is used, curing accelerators to more accelerate curing (radical polymerization) are usable jointly with the curing agent, if necessary. Examples of the above curing accelerator include: organometallic salts such as cobalt octenoate; organic amines; and β-diketones. However, there is no especial limitation thereto. These curing accelerators may be used either alone respectively or in combinations with each other. Incidentally, the amount or method of the addition of the curing accelerator is not especially limited, and may be set fitly according to factors such as composition of the treating agent or sort of the curing agent.

As is mentioned above, the heat-radical-curable resin composition or treating agent according to the present invention comprises the compound of foregoing general formula (1) and the specific curable resin. The saturated vapor pressure of the compound of foregoing formula (1) is merely in an extremely small or almost ignorable degree when compared with those of components such as styrene included in conventional resin compositions.

Therefore, a resin composition or treating agent with a low odor can be provided. This resin composition or treating agent gives out merely a weak odor or feels little odorous when used or handled, so not only the working environment, but also the periphery (environmental problems) of working places can be kept in a good state. In addition, the resin composition or treating agent according to the present invention may further comprise a low odorous monomer other than the compound of foregoing general formula (1) as the radical-polymerizable component. Examples of such a monomer include those which are previously exemplified as the aforementioned other radical-polymerizable component, such as 2-hydroxyethyl acrylate, 2-hydroxyethyl methacrylate, 2-hydroxypropyl acrylate, 2-hydroxypropyl methacrylate, and tetraethylene glycol diacrylate. However, there is no especial limitation thereto. These may be used either alone respectively or in combinations with each other.

As is mentioned above, the heat-radical-curable resin composition, according to the present invention, comprises the radical-polymerizable component in a ratio of higher than 90 weight %, and is characterized in that the radical-polymerizable component includes the compound of foregoing general formula (1) in a ratio of not lower than 5 weight % and further includes at least one member selected from the group consisting of unsaturated polyesters, epoxy (meth)acrylates, polyester (meth)acrylates, urethane (meth)acrylates, and crosslinkable (meth)acrylic polymers in a ratio of not lower than 5 weight %, wherein the at least one member has a polymerizable unsaturated double bond which is directly linked to an ester bond. Thus, the present invention heat-radical-curable resin composition or the present invention treating agent comprising this resin composition is very excellent in the impregnability into materials such as cellulosic substrates, and further, is very excellent in the impregnability, the hydrophobicity, and the heat resistance when used for materials such as cellulosic substrates because the above resin composition or treating agent comprises the specific compound (1) and the specific resin in the specific ratios respectively wherein the specific compound (1) exhibits excellent hydrophobicity by thermosetting, and wherein the specific resin has a polymerizable unsaturated double bond, as directly linked to an ester bond, and exhibits high heat-radical-curing polymerizability and gives a polymer having a strong framework and excellent heat resistance. Furthermore, because the specific compound of foregoing general formula (1) and the specific resin, which has a polymerizable unsaturated double bond as directly linked to an ester bond, are jointly used in the specific ratios respectively, the surface physical properties or surface material feel of substrates as treated with the present invention heat-radical-curable treating agent is more excellent than those of conventional ones. Particularly as to the surface hardness, excellent performance can be given.

A cured product by curing the present invention heat-radical-curable resin composition is excellent in the adhesion to various substrates such as common synthetic resins, metals, wood, and glass. In other words, a cured product which is excellent in the adhesion to substrates such as synthetic resins is obtainable by a process including the steps of, for example, coating the treating agent (comprising the present invention resin composition) to the substrates such as synthetic resins, and then curing the resin composition.

Incidentally, the method for curing the present invention heat-radical-curable resin composition or treating agent is not especially limited.

(Uses):

Similarly to compositions as conventionally used, the present invention heat-radical-curable resin composition or the present invention treating agent comprising this resin composition is, for example, usable for the following materials: cellulosic materials such as wood plates, dressing paper, laminated plywood, wood chips, and woody fibers; various FRP-molded products; resins for press, cast, button, dressing plates, or insulating varnish; coating materials for various substrates such as plastics, metals, glass, ceramics, particle boards, concrete, and asphalt; resins for public works and buildings and for paints; putty, sealants, adhesives, resins for chemical anchors, printing ink binders, resins for photoforming, resins for solder resists, resins for photoresists, and resins for typographs. Particularly, the use for the cellulosic materials is preferable.

When wood chips of particle boards or cellulose fibers of fiber boards are treated, the present invention composition or treating agent can serve both as a modifier and binder for the wood chips or cellulose fibers.

In addition, this composition or treating agent is usable not only for cellulosic materials, but also for other materials such as plastics, metals, glass, and ceramics. Incidentally, in cases of simple surface coating, the present invention resin composition or treating agent may be coated to surfaces of materials to be treated, and then the treating agent may be cured.

In addition, the present invention heat-radical-curable resin composition or treating agent enables the composition to be impregnated even into almost unprocessed wood and then cured.

As is mentioned above, for example, adhesives, modifiers, or binders for cellulosic substrates or wood substrates are also included in examples of preferred embodiments of the present invention.

EFFECTS AND ADVANTAGES OF THE INVENTION

The use of the treating agent according to the present invention provides excellent results, for example, with regard to the surface hardness enhancement effect and the heat resistance enhancement effect, and enables efficient electron beam curing treatment.

In addition, the present invention can provide a treatment process which is excellent, for example, with regard to the surface hardness enhancement effect and the heat resistance enhancement effect upon a material to be treated, and by which an electron beam curing treatment for the material is efficiently carried out.

Furthermore, the present invention heat-radical-curable resin composition and the treating agent comprising it exhibit excellent performance with regard to any of heat resistance, water resistance, surface physical properties, and impregnability when used for materials such as cellulosic substrates.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to the below-mentioned examples. In addition, in the examples, unless otherwise noted, the units "%" and "part(s)" denote those by weight.

Production Example 1
Example of Synthesis of Alkyl α-hydroxymethylacrylate

First, 400 g (4 mols) of ethyl acrylate, 86 g (1 mol) of 35 weight % aqueous formaldehyde solution, 98 g (0.5 mol) of 30 weight % aqueous trimethylamine solution (as a tertiary amine compound), and 0.4 g of p-methoxyphenol (as a polymerization inhibitor) were placed into a four-necked flask of 1,000 ml as equipped with a thermometer, a gas-blowing tube, a condenser, a stirrer, and a water bath. The ratio of p-methoxyphenol to ethyl acrylate is 1,000 ppm. Then, while air was allowed to blow into the resultant reaction solution, this reaction solution was allowed to react by stirring at 60° C. for 3 hours.

After the reaction had ended, the reaction solution was separated into an organic layer and a water layer, and the organic layer was then subjected to fractional distillation to obtain 111 g of colorless transparent liquid ethyl α-hydroxymethylacrylate as a distillate fraction of 73~76° C./5 mmHg.

Methyl α-hydroxymethylacrylate and n-butyl α-hydroxymethylacrylate were also synthesized in the same way as the above.

Production Example 2
Example of Synthesis of Epoxy Acrylate

An amount of 2,860 parts of Araldite GY-250 (made by Ciba-Geigy AG) (which is an epoxy compound with an epoxy equivalent of 185), 1,140 parts of acrylic acid, 0.4 parts of hydroquinone, and 12.0 parts of triethylamine (as an esterification catalyst) were placed into a four-necked flask as equipped with a thermometer, a stirrer, a air-blowing tube, and a condenser. The resultant mixture was allowed to react at 115° C. under an air current for 8.0 hours, thus obtaining an epoxy acrylate having an acid value of 7.9 and a number-average molecular weight of 515.

EXAMPLES 1~7

Electron-beam-curable treating agents (1)~(7) according to the present invention were prepared by uniformly mixing the components in their respective mixing ratios of Table 1.

Each of the prepared treating agents (1)~(7) was coated to a natural-wood-dressed plywood (as covered with a natural-wood veneer of 0.3 mm in thickness) so that the coating amount would be 8 g/shaku$^2$ (1 shaku$^2$=(0.303×0.303) m$^2$). Then, the coated plywood was left stationary for 1 hour to impregnate the plywood with each of the treating agents. Next, an electron beam was irradiated to the impregnated plywood under nitrogen atmosphere at an acceleration voltage of 300 kV, a dose of 200 kGy, and a conveyor speed of 6 m/min with an area beam type electron beam irradiation apparatus to cure the treating agent, thus obtaining each of treated wood (1)~(7). Each of the resultant treated wood (1)~(7) was cut into a test piece of 15 cm×15 cm.

The resultant test piece was evaluated with regard to heat resistance, surface hardness, and dry-to-touch. Results thereof are shown in Table 1. Incidentally, the evaluation with regard to heat resistance, surface hardness, and dry-to-touch was carried out by the following test methods:

(Heat Resistance)

The resultant test piece was left in a thermostat of 80±3° C. to evaluate the state of occurrence of cracks in the surface of the test piece with the eye after 48 hours and after 96 hours on the following standard:

○: No occurrence of cracks is observed.

Δ: Occurrence of small cracks is observed.

x: Occurrence of great cracks is observed.

(Surface Hardness)

The surface of the resultant test piece was scratched 5 times with a lead of a pencil under a load of 1 kg in accordance with a pencil-scratching test as prescribed in section 8.4.1 of JIS K 5400 (1995). The concentration symbol of the hardest of the pencils with which the number of times of scratching which came to make scratches on the surface was smaller than 2 was taken as the surface hardness.

(Dry-To-Touch)

After the irradiation of the electron beam, the dryness of the surface of each test piece was evaluated by finger touch on the following standard:

○: Tack-free.

Δ: A little tack is sensed.

X: Tack is sensed.

Comparative Examples 1~2

Comparative treating agents (1)~(2) were prepared in the mixing ratios of Table 1, and test pieces were produced therefrom and then subjected to the evaluation tests in the same way as of Example 1. Results thereof are shown in Table 1.

As is shown in Table 1, the treating agents (1)~(7) of Examples 1~7 provided good results in any test.

Production Example 3
Synthesis of Unsaturated Polyester (A-1)

First, 415 parts of isophthalic acid (as a dibasic acid (saturated dibasic acid compound)) and 600 parts of propylene glycol (as a polyhydric alcohol) were placed into a four-necked flask (as a reactor) as equipped with a thermometer, a nitrogen-introducing tube, a reflux condenser, and a stirrer. Next, while stirred under nitrogen atmosphere, the resultant mixture was heated to 215° C. and then allowed to run a condensation reaction at this temperature for 6 hours. Then, the resultant reaction product was cooled 100° C. when its solid acid value became 10 mgKOH/g. Then, 245 parts of maleic anhydride (as a dibasic acid (α,β-unsaturated dibasic acid compound)) was added to and mixed with the reaction product. Then, while stirred under nitrogen atmosphere, the resultant mixture was heated to 215° C. and then allowed to run a condensation reaction at this temperature for 10 hours, thus obtaining an unsaturated polyester having a solid acid value of 20 mgKOH/g as a reaction product, which was then mixed with 0.20 parts of hydroquinone (as a polymerization inhibitor) to obtain an unsaturated polyester (A-1).

Production Example 4
Synthesis of Epoxy Methacrylate (A-2)

First, 214 parts of methacrylic acid (as an unsaturated monobasic acid), 1,136 parts of bisphenol A type epoxy

TABLE 1

|  |  |  | Example | | | | | | | Comparative Example | |
|---|---|---|---|---|---|---|---|---|---|---|---|
|  |  |  | 1 | 2 | 3 | 4 | 5 | 6 | 7 | 1 | 2 |
| High boiling point resin | Radical-polymerizable component | MHMA[1] |  |  |  |  | 3 | 2 | 2 |  |  |
|  |  | EHMA[2] | 50 | 30 | 30 | 80 |  |  |  |  |  |
|  |  | BHMA[3] |  |  |  |  | 3 | 3 | 3 |  |  |
|  |  | HEMA[4] |  | 20 |  |  | 20 | 45 | 45 | 50 |  |
|  |  | HEA[5] |  |  |  |  |  |  |  |  | 50 |
|  |  | EPA[6] | 50 | 50 |  |  | 24 | 45 | 45 | 50 | 50 |
|  |  | HDA[7] |  |  | 30 | 20 |  |  |  |  |  |
|  |  | Methacrylate-containing PMMA[8] |  |  |  |  |  | 5 | 5 |  |  |
|  | Nonradical-polymerizable component | PPG[9] |  |  |  |  |  | 10 | 20 |  |  |
| Another component |  | MMA[10] |  |  | 40 |  | 50 | 20 | 20 |  |  |
| Evaluation results | Heat resistance test | 48 hours | ○ | ○ | ○ | ○ | Δ | ○ | Δ | X | Δ |
|  |  | 96 hours | ○ | Δ | ○ | ○ | Δ | ○ | Δ | X | X |
|  | Surface hardness test |  | 2H | 2H | 2H | 2H | 2H | H | H | 2H | HB |
|  | Dry-to-touch test |  | ○ | ○ | ○ | ○ | Δ | ○ | Δ | Δ | ○ |

[1] Methyl α-hydroxymethylacrylate;
[2] Ethyl α-hydroxymethylacrylate;
[3] n-Butyl α-hydroxymethylacrylate;
[4] 2-Hydroxyethyl methacrylate;
[5] 2-Hydroxyethyl acrylate;
[6] Epoxy acrylate;
[7] 1,6-Hexanediol diacrylate;
[8] Methacrylate-containing poly(methyl methacrylate);
[9] Polypropylene glycol;
[10] Methyl methacrylate compound (trade name: EPOTOHTO YD-901, made by Toto Kasei Co., Ltd., average epoxy equivalent=454.2) (as a polyfunctional epoxy compound), 5.8 parts of triethylamine (as an esterification catalyst), and 0.27 parts of hydroquinone were placed into a four-necked flask (as a reactor) as equipped with a thermometer, an air-blowing tube, a reflux condenser, and a stirrer. Next, while the resultant mixture was stirred under air blowing into it, the mixture was allowed to run an esterification reaction at 115° C. for 5.5 hours, thus obtaining an epoxy methacrylate (A-2) having a solid acid value of 7.4 mgKOH/g.

Production Example 5
Synthesis of Urethane Methacrylate (A-3)

First, 664 parts of bisphenol A-ethylene oxide adduct (trade name: BPX-33, made by Asahi Denka Kogyo Co., Ltd.) (as a polyol compound) and 0.14 parts of di-n-butyltin dilaurate (as a urethanization catalyst) were placed into a four-necked flask (as a reactor) as equipped with a thermometer, an air-blowing tube, a dropping funnel, a reflux condenser, and a stirrer. On the other hand, 398 parts of 2,4-tolylene diisocyanate (as a polyisocyanate compound) was placed into the dropping funnel. Next, while the resultant mixture in the flask was stirred under air blowing into it, the mixture was heated to 55° C., and then 398 parts of 2,4-tolylene diisocyanate was dropwise added to the mixture at this temperature. After the dropwise addition had ended, the resultant mixture was allowed to run a urethanization reaction at the above temperature for 1 hour. Then, 338 parts of 2-hydroxypropyl methacrylate (as a hydroxyl-group-containing (meth)acrylate compound) was added to and mixed with the resultant reaction product.

Then, while the resultant mixture was stirred under air blowing into it, the mixture was heated to 95° C. and then allowed to run a urethanization reaction at this temperature for 2 hours, thus obtaining a urethane methacrylate (A-3). The formation of this urethane methacrylate was verified by measuring its infrared absorption spectrum to find that the characteristic absorption by the isocyanate group had disappeared.

Production Example 6
Synthesis of Polyester Methacrylate (A-4)

First, 450 parts of isophthalic acid and 220 parts of adipic acid (both as dibasic acids (saturated dibasic acid compounds)), and further, 640 parts of diethylene glycol (as a polyhydric alcohol) were placed into a four-necked flask (as a reactor) as equipped with a thermometer, a gas-introducing tube, a reflux condenser, and a stirrer. Next, while stirred under nitrogen atmosphere, the resultant mixture was heated to 215° C. and then allowed to run an esterification reaction at this temperature for 7 hours. Then, the resultant reaction product was cooled 100° C. when its solid acid value became 10 mgKOH/g. Then, 178 parts of maleic anhydride (as a dibasic add ($\alpha,\beta$-unsaturated dibasic acid compound)) was added to and mixed with the reaction product.

Then, while stirred under nitrogen atmosphere, the resultant mixture was heated to 215° C. and then allowed to run an esterification reaction at this temperature for 8 hours. Then, the resultant reaction product was cooled 120° C. when its solid acid value became 64 mgKOH/g. Then, 220 parts of glycidyl methacrylate (as a (meth)acryloyl-group-containing compound (unsaturated glycidyl ester compound)) and 3.5 parts of zinc octenoate (as an esterification catalyst) were added to and mixed with the reaction product, namely, an unsaturated polyester.

Then, while stirred under air atmosphere, the resultant mixture was allowed to run an esterification reaction at 120° C. for 3 hours, thus obtaining a polyester methacrylate (A-4) having a solid acid value of not larger than 2.2 mgKOH/g.

Production Example 7
Synthesis of Polyester Methacrylate (A-5)

First, 940 parts of tetrahydrophthalic anhydride (as a dibasic acid (saturated dibasic acid compound)) and 780 parts of diethylene glycol were placed into a four-necked flask (as a reactor) as equipped with a thermometer, a gas-introducing tube, a reflux condenser, and a stirrer. Next, while stirred under nitrogen atmosphere, the resultant mixture was heated to 215° C. and then allowed to run an esterification reaction at this temperature for 5 hours. Then, the resultant reaction product was cooled 100° C. when its solid acid value became 10 mgKOH/g. After the reflux condenser was replaced with a Liebig condenser, 130 parts of methacrylic acid (as a (meth)acryloyl-group-containing compound (unsaturated monobasic acid)), 24.0 parts of p-toluenesulfonic acid (as an esterification catalyst), and 555 parts of toluene (as a solvent) were added to and mixed with the reaction product, namely, a saturated polyester.

Then, while stirred under air atmosphere, the resultant mixture was allowed to run an azeotropic dehydration reaction (esterification reaction) at 125° C. for 12 hours. Then, the inside of the reactor was put under vacuum to remove (distil off) toluene from the resultant reaction product, thus obtaining a polyester methacrylate (A-5) having a solid acid value of 12.0 mgKOH/g.

Production Example 8
Synthesis of Crosslinkable Acrylic Polymer (A-6)

First, 95 parts of methyl methacrylate (hereinafter referred to as MMA) and 5 parts of methacrylic acid (hereinafter referred to as MAA) were placed into a reactor as equipped with a thermometer, a condenser, a nitrogen-gas-introducing tube, and a stirrer, and then the internal air of the reactor was replaced with nitrogen gas. Next, while stirred, the resultant mixture was heated to 80° C., and then thereto 0.03 parts of 2,2'-azobisisobutyronitrile (hereinafter referred to as AIBN) (as a polymerization initiator) and 2.5 parts of β-mercaptopropionic acid (as a chain transfer agent) were added to run a copolymerization reaction for 4 hours, thus obtaining a methacrylic syrup which contained an MMA/MAA copolymer as a (meth)acrylic polymer.

Next, 9 parts of glycidyl methacrylate (hereinafter referred to as GMA) (which is an unsaturated epoxy compound), 0.3 parts of triphenylphosphine (as an esterification catalyst), and 0.05 parts of p-methoxyphenol were added to the above methacrylic syrup, and the resultant mixture was heated to 100° C. to run an esterification reaction under air atmosphere for 3 hours.

As a result, a crosslinkable methacrylic syrup (A-6) (which is a crosslinkable acrylic polymer) was obtained. This methacrylic syrup had a number-average molecular weight of 10,000, a weight-average molecular weight of 18,000 (both were measured by GPC (gel permeation chromatography), a solid content of 48 weight %, and an acid value of 7 mgKOH/g. In addition, it had a double-bond equivalent of 2,000 as determined from the difference between acid values before and after the esterification reaction.

EXAMPLES 8~18

Heat-radical-curable resin compositions (1B)~(11B) according to the present invention were prepared by uniformly mixing the components in their respective mixing ratios of Table 2.

Each of the prepared resin compositions (1B)~(11B) was coated to a natural-wood-dressed plywood (as covered with a natural-wood veneer of 0.3 mm in thickness) so that the coating amount would be 8 g/shaku$^2$ (1 shaku$^2$=(0.303× 0.303) m$^2$). Then, the coated plywood was left stationary for about 15 minutes to impregnate the plywood with each of the resin compositions. Next, the impregnated plywood was cured with a hot press (at 120° C., 5 kgf/cm² for 10 minutes), thus obtaining each of treated wood (1C)~(11C).

Each of the resultant treated wood (1C)~(11C) was cut into a test piece of 15 cm×15 cm.

The resultant test piece was evaluated with regard to heat resistance, water resistance, and surface hardness. Results thereof are shown in Table 3. Incidentally, the evaluation with regard to heat resistance, water resistance, and surface hardness was carried out by the following test methods:

(a) Heat Resistance

The resultant test piece was left in a thermostat of 80±3° C. to evaluate the state of occurrence of cracks in the surface of the test piece with the eye after 48 hours and after 96 hours on the following standard:

⊚: No occurrence of cracks is observed.

○: Occurrence of minute cracks which are difficult to verify with the eye is observed.

Δ: Occurrence of small cracks is observed.

X: Occurrence of great cracks is observed.

(b) Water Resistance

Water of 25±3° C. in temperature was left on the resultant test piece for 24 hours, and then the test piece was dried by leaving it stationary in a thermostat of 60±3° C. for 24 hours. A process comprising these steps was taken as 1 cycle. Every cycle, the state of occurrence of cracks in the surface of the test piece was evaluated with the eye on the same standard as that of the heat resistance test.

(c) Surface Hardness

The surface of the resultant test piece was scratched 5 times with a lead of a pencil under a load of 1 kg in accordance with a pencil-scratching test as prescribed in section 8.4.1 of JIS K 5400 (1995). The concentration symbol of the hardest of the pencils with which the number of times of scratching which came to make scratches on the surface was smaller than 2 was taken as the surface hardness.

Comparative Examples 3~8

Comparative compositions (1D)~(6D) were prepared in the mixing ratios of Table 2, and test pieces were produced therefrom and then subjected to the evaluation tests in the same way as of Example 8. Results thereof are shown in Table 3.

As is shown in Table 3, the resin compositions (1B)~(11B) of Examples 8~18 provided good results in any test.

As is mentioned above, it was found that the above examples of embodiments of the present invention were, for example, effectively usable as treating agents, impregnating agents, and adhesives for cellulosic substrates or wood. In addition, the above examples of embodiments of the present invention can be utilized as effective compositions or treating agents not only for the above substrates, but also for other substrates.

EXAMPLE 19

A treating agent was prepared by uniformly mixing the resin composition (4B) (comprising the component combination of Example 11) with 10 parts of butyl acetate and then diluting the resultant mixture with a solvent. This treating agent was coated to a natural-wood-dressed plywood by the same treatment process as of Example 11 and then dried at 80° C. for 5 minutes, when the workability was good with no problem. Because the viscosity of the treating agent decreased due to the dilution with the solvent, the coating operation became better. In addition, the impregnability into the natural-wood-dressed plywood was also good. This plywood was similarly cured with a hot press, thus obtaining treated wood (12C). In addition, similarly, a test piece was cut out and then evaluated with regard to heat resistance, water resistance, and surface hardness. Results thereof are as follows: heat resistance after 48 hours=⊚, heat resistance after 96 hours=○, 1 cycle of water resistance test=○, 2 cycles of water resistance test=○, and surface hardness=2H. These are almost the same results as those of Example 11, but the impregnability into the wood became better because of the dilution with the solvent, therefore the results were a little better.

TABLE 2

| | | Example | | | | | | | | | | Comparative Example | | | | | |
|---|---|---|---|---|---|---|---|---|---|---|---|---|---|---|---|---|---|
| | | 8<br>1B | 9<br>2B | 10<br>3B | 11<br>4B | 12<br>5B | 13<br>6B | 14<br>7B | 15<br>8B | 16<br>9B | 17<br>10B | 18<br>11B | 3<br>1D | 4<br>2D | 5<br>3D | 6<br>4D | 7<br>5D | 8<br>6D |
| Heat resistance test | 48 hours | ○ | ○ | ⊚ | ⊚ | ⊚ | ⊚ | ⊚ | ⊚ | ⊚ | ⊚ | ⊚ | Δ | Δ | Δ | Δ | Δ | Δ |
| | 96 hours | Δ | Δ | ○ | ○ | ⊚ | ⊚ | ⊚ | ⊚ | ⊚ | ⊚ | ⊚ | X | X | X | X | X | X |
| Water resistance | 1 cycle | ○ | ○ | ⊚ | ○ | ○ | ⊚ | ⊚ | ⊚ | ⊚ | ⊚ | ⊚ | X | X | X | X | X | X |
| | 2 cycles | Δ | Δ | ○ | Δ | Δ | ○ | ○ | ○ | ○ | ○ | ○ | — | — | — | — | — | — |
| Surface hardness | | H | H | H | 2H | HB | H | H | H | H | H | 2H | H | H | H | H | H | H |

TABLE 3

|  |  | Example |  |  |  |  |  |  |  |  |  |  | Comparative Example |  |  |  |  |  |
|---|---|---|---|---|---|---|---|---|---|---|---|---|---|---|---|---|---|---|
|  |  | 8 | 9 | 10 | 11 | 12 | 13 | 14 | 15 | 16 | 17 | 18 | 3 | 4 | 5 | 6 | 7 | 8 |
| Radical-polymerizable component | A-1 | 20 |  |  |  |  |  |  |  |  |  | 50 | 20 |  |  |  |  |  |
|  | A-2 |  | 20 | 20 | 50 | 20 | 20 |  |  |  |  |  |  | 20 |  |  |  |  |
|  | A-3 |  |  |  |  |  |  | 20 |  |  |  |  |  |  | 20 |  |  |  |
|  | A-4 |  |  |  |  |  |  |  | 20 |  |  |  |  |  |  | 20 |  |  |
|  | A-5 |  |  |  |  |  |  |  |  | 20 |  |  |  |  |  |  | 20 |  |
|  | A-6 |  |  |  |  |  |  |  |  |  | 21 |  |  |  |  |  |  | 21 |
|  | MHMA[1] | 3 |  |  |  |  |  |  |  |  |  |  |  |  |  |  |  |  |
|  | EHMA[2] |  | 10 | 50 | 20 | 50 | 50 | 50 | 50 | 50 | 50 | 30 |  |  |  |  |  |  |
|  | BHMA[3] | 3 |  |  |  |  |  |  |  |  |  |  |  |  |  |  |  |  |
|  | HEMA[4] |  |  |  | 10 |  |  |  |  |  |  |  | 50 | 50 | 50 | 50 | 50 | 50 |
|  | MMA[5] | 64 | 60 | 30 | 10 | 25 | 25 | 30 | 30 | 30 | 19 |  | 30 | 30 | 30 | 30 | 30 | 19 |
|  | 1,6-HX-DA[6] | 10 | 10 |  |  |  |  |  |  |  |  |  |  |  |  |  |  |  |
|  | Styrene |  |  |  |  |  |  |  |  |  |  | 20 |  |  |  |  |  |  |
| Nonradical-polymerizable component | PEG[7] |  |  |  |  | 5 |  |  |  |  |  |  |  |  |  |  |  |  |
|  | PP[8] |  |  |  |  |  | 6 |  |  |  |  |  |  |  |  |  |  |  |
| Thermopolymerization initiator | Percure WO[9] | 3 | 3 | 3 | 3 | 3 | 3 | 3 | 3 | 3 | 3 | 3 | 3 | 3 | 3 | 3 | 3 | 3 |

[1] Methyl α-hydroxymethylacrylate;
[2] Ethyl α-hydroxymethylacrylate;
[3] n-Butyl α-hydroxymethylacrylate;
[4] 2-Hydroxyethyl methacrylate;
[5] Methyl methacrylate;
[6] 1,6-hexanediol diacrylate;
[7] Polyethylene glycol;
[8] Powdery polypropylene;
[9] Trade name, made by NOF CORPORATION Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. An electron-beam-curable treating agent, which is curable by electron beam irradiation at an acceleration voltage of 300 kV and a dose of 200 kGy and comprises a high boiling point resin in a ratio of not lower than 10 weight % and is used for application to a cellulosic material, with the electron-beam-curable treating agent being characterized in that the high boiling point resin includes a high boiling point radical-polymerizable component in a ratio of higher than 90 weight %, wherein the high boiling point radical-polymerizable component includes a compound of general formula (1) below in a ratio of not lower than 5 weight %, wherein the compound of general formula (1) comprises a compound of general formula (1) wherein $R_6$ is a hydrogen atom, wherein general formula (1) is:

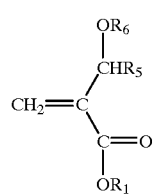

(1)

wherein:
$R_1$ is a hydrogen atom, an alkyl group with 1~18 carbon atoms, a cycloalkyl group with 3~10 carbon atoms, an aryl group, a hydroxyalkyl group with 1~8 carbon atoms, a $-(CH_2)_m NR_2 R_3$ group, or a $-(C_2H_4O)_n R_4$ group, wherein: $R_2$ and $R_3$ are linear or branched alkyl groups with 1~8 carbon atoms; $R_4$ is a linear or branched alkyl group with 1~18 carbon atoms; m is an integer of 2~5; and n is an integer of 1~80;

$R_5$ is a hydrogen atom, an alkyl group with 1~12 carbon atoms, a cycloalkyl group with 3~10 carbon atoms, an aryl group, a hydroxyalkyl group with 1~12 carbon atoms, or an oxirane group with 2~8 carbon atoms; and $R_6$ is a hydrogen atom,

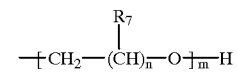

wherein:
$R_7$ is a hydrogen atom or organic residue;
n is an integer of 1~3; and
m is an integer of 1~100,

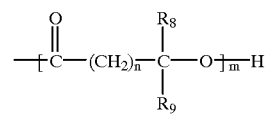

wherein:
each of $R_8$ and $R_9$ is independently a hydrogen atom or organic residue;
n is an integer of 0~5; and m is an integer of 1~100, or

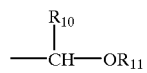

wherein:
R$_{10}$ is a hydrogen atom, an alkyl group with 1~6 carbon atoms, a cycloalkyl group with 3~8 carbon atoms, or an aryl group with 6~18 carbon atoms; and R$_{11}$ is an alkyl group with 1~18 carbon atoms, a cycloalkyl group with 3~8 carbon atoms, an aryl group with 6~18 carbon atoms, or a
—(CHR$_{12}$CH$_2$O)$_m$R$_{13}$ group, wherein: R$_{12}$ is a hydrogen atom or a methyl group; R$_{13}$ is a hydrogen atom, an alkyl group with 1~6 carbon atoms, a cycloalkyl group with 3~8 carbon atoms, or an aryl group with 6~18 carbon atoms; and m is an integer of 1~4.

2. An electron-beam-curable treating agent according to claim 1, wherein the cellulosic material is wood.

3. An electron-beam-curable treating agent according to claim 1, wherein the cellulosic material is paper.

4. An electron-beam-curable treating agent according to claim 1, wherein the electron-beam-curable treating agent is free of an amino resin.

5. An electron-beam-curable treating agent according to claim 1, wherein the compound of general formula (1) having a hydrogen atom for R$_6$ is present in a ratio of not lower than 5 weight % relative to the high boiling point radical-polymerizable component.

6. A heat-radical-curable resin composition, which is free of an amino resin and which comprises a radical-polymerizable component in a ratio of higher than 90 weight %, wherein the radical-polymerizable component includes a compound of general formula (1) below in a ratio of not lower than 5 weight %, wherein the compound of general formula (1) comprises a compound of general formula (1) wherein R$_6$ is a hydrogen atom, and further includes at least one member selected from the group consisting of unsaturated polyesters, epoxy (meth)acrylates, polyester (meth)acrylates, urethane (meth)acrylates, and crosslinkable (meth)acrylic polymers in a ratio of not lower than 5 weight %, wherein the at least one member has a polymerizable unsaturated double bond which is directly linked to an ester bond, and wherein general formula (1) is:

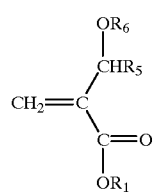

(1)

wherein:
R$_1$ is a hydrogen atom, an alkyl group with 1~18 carbon atoms, a cycloalkyl group with 3~10 carbon atoms, an aryl group, a hydroxyalkyl group with 1~8 carbon atoms, a —(CH$_2$)$_m$NR$_2$R$_3$ group, or a —(C$_2$H$_4$O)$_n$R$_4$ group, wherein: R$_2$ and R$_3$ are linear or branched alkyl groups with 1~8 carbon atoms; R$_4$ is a linear or branched alkyl group with 1~18 carbon atoms; m is an integer of 2~5; and n is an integer of 1~80;

R$_5$ is a hydrogen atom, an alkyl group with 1~12 carbon atoms, a cycloalkyl group with 3~10 carbon atoms, an aryl group, a hydroxyalkyl group with 1~12 carbon atoms, or an oxirane group with 2~8 carbon atoms; and R$_6$ is a hydrogen atom,

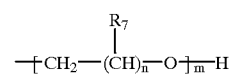

wherein:
R$_7$ is a hydrogen atom or organic residue;
n is an integer of 1~3; and
m is an integer of 1~100,

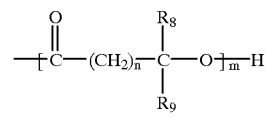

wherein:
each of R$_8$ and R$_9$ is independently a hydrogen atom or organic residue;
n is an integer of 0~5; and
m is an integer of 1~100, or

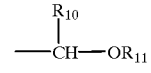

wherein:
R$_{10}$ is a hydrogen atom, an alkyl group with 1~6 carbon atoms, a cycloalkyl group with 3~8 carbon atoms, or an aryl group with 6~18 carbon atoms; and R$_{11}$ is an alkyl group with 1~18 carbon atoms, a cycloalkyl group with 3~8 carbon atoms, an aryl group with 6~18 carbon atoms, or a
—(CHR$_{12}$CH$_2$O)$_m$R$_{13}$ group, wherein: R$_{12}$ is a hydrogen atom or a methyl group; R$_{13}$ is a hydrogen atom, an alkyl group with 1~6 carbon atoms, a cycloalkyl group with 3~8 carbon atoms, or an aryl group with 6~18 carbon atoms; and m is an integer of 1~4.

7. A heat-radical-curable resin composition according to claim 6, wherein the compound of general formula (1) having a hydrogen atom for R$_6$ is present in a ratio of not lower than 5 weight % relative to the radical-polymerizable component.

8. A heat-radical-curable resin composition according to claim 6, which is used for application to a cellulosic material.

9. A heat-radical-curable treating agent, which comprises the heat-radical-curable resin composition as recited in claim 8 in a ratio of not lower than 5 weight %.

10. A heat-radical-curable treating agent, which comprises the heat-radical-curable resin composition as recited in claim 6 in a ratio of not lower than 5 weight %.

* * * * *